United States Patent
Ma et al.

(10) Patent No.: US 10,237,861 B2
(45) Date of Patent: Mar. 19, 2019

(54) INFORMATION TRANSMISSION METHOD, DEVICE, AND SYSTEM

(71) Applicant: HUAWEI TECHNOLOGIES CO., LTD., Shenzhen (CN)

(72) Inventors: Jie Ma, Beijing (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 15/293,693

(22) Filed: Oct. 14, 2016

(65) Prior Publication Data
US 2017/0034809 A1    Feb. 2, 2017

Related U.S. Application Data

(63) Continuation of application No. PCT/CN2014/075518, filed on Apr. 16, 2014.

(51) Int. Cl.
H04W 72/04 (2009.01)
H04W 76/14 (2018.01)
(Continued)

(52) U.S. Cl.
CPC ......... H04W 72/042 (2013.01); H04L 5/0005 (2013.01); H04W 48/16 (2013.01);
(Continued)

(58) Field of Classification Search
None
See application file for complete search history.

(56) References Cited

U.S. PATENT DOCUMENTS

2002/0062336 A1* 5/2002 Teodosiu ............... H04L 29/06
  709/201
2013/0155894 A1* 6/2013 Li ..................... H04W 74/0833
  370/252
(Continued)

FOREIGN PATENT DOCUMENTS

CN    102958066    3/2013
CN    103250452    8/2013
(Continued)

OTHER PUBLICATIONS

International Search Report dated Jan. 21, 2015 in corresponding International Application No. PCT/CN2014/075518.
(Continued)

*Primary Examiner* — Hassan A Phillips
*Assistant Examiner* — Gautam Sharma
(74) *Attorney, Agent, or Firm* — Staas & Halsey LLP

(57) ABSTRACT

The present invention discloses an information transmission method, a device, and a system, relates to the communications field, and can resolve a problem of inappropriate time-frequency resource allocation in a device-to-device technology. A specific solution is as follows: user equipment obtains discovery information, generates request information according to the discovery information, sends the request information to a base station, receives resource information sent by the base station, and sends the discovery information to other user equipment according to an effective time-frequency resource included in the resource information. The present invention is used for information transmission.

17 Claims, 5 Drawing Sheets

(51) Int. Cl.
H04W 76/27 (2018.01)
H04W 72/00 (2009.01)
H04W 72/02 (2009.01)
H04L 5/00 (2006.01)
H04W 48/16 (2009.01)
H04W 88/02 (2009.01)
H04W 88/08 (2009.01)

(52) U.S. Cl.
CPC ........... *H04W 72/00* (2013.01); *H04W 72/02* (2013.01); *H04W 72/04* (2013.01); *H04W 76/14* (2018.02); *H04W 76/27* (2018.02); *H04W 88/02* (2013.01); *H04W 88/08* (2013.01)

(56) References Cited

U.S. PATENT DOCUMENTS

| | | | | |
|---|---|---|---|---|
| 2013/0188546 A1* | 7/2013 | Turtinen | ............... | H04W 8/005 370/312 |
| 2013/0288668 A1* | 10/2013 | Pragada | ................ | H04W 12/06 455/426.1 |
| 2014/0162668 A1* | 6/2014 | Na | ..................... | H04W 72/121 455/450 |
| 2014/0164563 A1* | 6/2014 | Leekley | .............. | H04L 67/1074 709/217 |
| 2014/0194115 A1* | 7/2014 | Yang | ................. | H04W 52/0219 455/426.1 |
| 2014/0213186 A1* | 7/2014 | Gage | ....................... | H04W 4/21 455/41.2 |
| 2014/0220895 A1* | 8/2014 | Wei | ........................ | H04W 4/70 455/41.2 |
| 2014/0335875 A1* | 11/2014 | Li | ......................... | H04W 8/005 455/450 |
| 2014/0378123 A1* | 12/2014 | Stojanovski | ...... | H04W 52/0251 455/422.1 |
| 2015/0009910 A1* | 1/2015 | Ryu | ...................... | H04W 72/04 370/329 |
| 2015/0043448 A1* | 2/2015 | Chatterjee | ............. | H04W 8/005 370/329 |
| 2015/0131475 A1* | 5/2015 | Van Phan | ................ | H04W 8/26 370/254 |
| 2016/0007152 A1* | 1/2016 | Johnsson | ............ | H04W 72/042 370/329 |

FOREIGN PATENT DOCUMENTS

| | | |
|---|---|---|
| CN | 103327568 | 9/2013 |
| JP | 2016-539603 A | 12/2016 |
| WO | 2015/065130 A1 | 5/2015 |

OTHER PUBLICATIONS

Written opinion of the International Search authority dated Jan. 21, 2015 in corresponding International Application No. PCT/CN2014/075518.

Extended European Search Report dated Mar. 7, 2017, in European Patent Application No. 14889431.4.

Vol. RAN WG2, no. Valencia, Spain; Mar. 31, 2014-Apr. 4, 2014 Apr. 4, 2014 (Apr. 4, 2014), XP050818051,Retrieved from the Internet: URL: http ://www.3gpp.org/ftp/tsg_ran/WG2_RL2/TSGR2_85bi s/Docs/ [retrieved on Apr. 4, 2014] Chapter 23.Y "Support for Device to Device Direct Discovery", Chapter 23.Y.1 "General", Chapter 23.Y.3 "Radio resource allocation".

Vol. RAN WG1, no. Barcelona, Spain; Aug. 19, 2013-Aug. 23, 2013 Aug. 10, 2013 (Aug. 10, 2013), XPO50716361, Retrieved from the Internet: URL:http://www.3gpp.org/ftp/tsg_ran/WGI_RL1/TSGRI_74/Docs/ [retrieved on Aug. 10, 2013] Chapter 2 "Discovery Procedures", Chapter 2.1. "Within network coverage", "Steps 0-5"; figures 1, 2.

Vol. RAN WG2, no. Ljubljana, Slovenia; Oct. 7, 2013-Oct. 11, 2013 Sep. 27, 2013 (Sep. 27, 2013), XP050718925, Retrieved from the Internet: URL: http ://www.3gpp.org/ftp/tsg_ran/WG2_RL2/TSGR2_83bi s/Docs/[retrieved on Sep. 27, 2013] Chapter 2.1 "Discovery Resource Configuration and Signaling", Chapter 2.2 "Resource selection by D2D UE for transmitting discovery information".

Japanese Office Action dated Jul. 3, 2018 in corresponding Japanese Patent Application No. 2016-562877, 8 pgs.

* cited by examiner

INFORMATION TRANSMISSION METHOD, DEVICE, AND SYSTEM

CROSS-REFERENCE TO RELATED APPLICATIONS

This application is a continuation of International Application No. PCT/CN2014/075518, filed on Apr. 16, 2014, the disclosure of which is hereby incorporated by reference in its entirety.

TECHNICAL FIELD

The present invention relates to the communications field, and in particular, to an information transmission method, a device, and a system.

BACKGROUND

User equipment can simultaneously perform cellular communication and direct communication between user equipments by using a D2D (device-to-device) technology. At present, development of applications such as a social network and user short-distance data sharing makes people have an increasingly intense need for the D2D technology, and wide application of the D2D technology can resolve a spectrum resource shortage problem of a wireless communications system to some extent, and can further reduce cell network load.

However, in the prior art, when sending information, user equipment needs to listen to a time-frequency resource set corresponding to the information, and select an unoccupied time-frequency resource, which easily causes a same time-frequency resource to be selected by multiple user equipments at the same time. Consequently, the information cannot be properly transmitted.

SUMMARY

Embodiments of the present invention provide an information transmission method, a device, and a system, which can resolve a problem of inappropriate time-frequency resource allocation in a device-to-device technology.

To achieve the foregoing objective, the following technical solutions are adopted in the embodiments of the present invention.

According to a first aspect, user equipment applied to a device-to-device technology is provided, including:
  an obtaining unit, configured to obtain discovery information, where the discovery information is information that the user equipment needs to send to other user equipment by means of direct communication between devices;
  a request unit, configured to generate request information according to the discovery information obtained by the obtaining unit, where the request information is used to request a base station to allocate, to the user equipment, a time-frequency resource used to send the discovery information;
  a sending unit, configured to send the request information generated by the request unit to the base station; and
  a receiving unit, configured to receive resource information sent by the base station, where the resource information includes the effective time-frequency resource, and the effective time-frequency resource is a time-frequency resource that is allocated by the base station to the user equipment and used to send the discovery information, where
  the sending unit is further configured to send the discovery information to the other user equipment by using the effective time-frequency resource received by the receiving unit.

With reference to the first aspect, in a first possible implementation manner,
  the request unit is specifically configured to: determine a sending period of the discovery information and sending duration of the discovery information according to the discovery information, and generate the request information, where the request information includes the sending period of the discovery information and the sending duration of the discovery information.

With reference to the first possible implementation manner of the first aspect, in a second possible implementation manner,
  the resource information further includes a preset period and preset duration, where the preset period and the preset duration are a period and duration occupied by the effective time-frequency resource allocated by the base station to the user equipment; and
  the sending unit is specifically configured to: match the discovery information and the time-frequency resource of the discovery information, and send the discovery information to the other user equipment according to the preset period and the preset duration.

With reference to the first aspect or either of the first to the second possible implementation manners of the first aspect, in a third possible implementation manner,
  the sending unit is specifically configured to send the request information to the base station by carrying the request information in a radio resource control RRC message or a buffer status report BSR message.

According to a second aspect, a base station applied to a device-to-device technology is provided, including:
  a receiving unit, configured to receive request information sent by user equipment, where the request information is used to request the base station to allocate, to the user equipment, a time-frequency resource used to send discovery information, and the discovery information is information that the user equipment needs to send to other user equipment by means of direct communication between devices;
  an allocation unit, configured to: allocate, to the user equipment according to the request information received by the receiving unit, the time-frequency resource used to send the discovery information, and generate resource information, where the resource information includes the effective time-frequency resource, and the effective time-frequency resource is a time-frequency resource that is allocated by the base station to the user equipment and used to send the discovery information; and
  a sending unit, configured to send the resource information generated by the allocation unit to the user equipment.

With reference to the second aspect, in a first possible implementation manner,
  the request information includes a sending period of the discovery information and sending duration of the discovery information; and
  the allocation unit is specifically configured to: allocate, to the user equipment according to the request information, the time-frequency resource used to send the discovery information, determine a preset period and preset duration according to the sending period of the discovery information and the sending duration of the discovery information, and generate the resource information, where the resource information includes the effective time-frequency resource, the preset period, and the preset duration; the effective time-frequency resource is a time-frequency resource that is allocated by the base station to the user equipment and used to send the discovery information; and the preset period and the preset duration are a period and duration occupied by the effective time-frequency resource allocated by the base station to the user equipment.

With reference to the second aspect or the first possible implementation manner of the second aspect, in a second possible implementation manner, the sending unit is specifically configured to: send the resource information to the user equipment by carrying the resource information in a radio resource control RRC message, or send the resource information to the user equipment by carrying the resource information on a physical downlink control channel PDCCH.

According to a third aspect, user equipment applied to a device-to-device technology is provided, including a processor, a memory, a transmitter, a receiver, and a bus, where the processor, the memory, the transmitter, and the receiver are connected to each other by using the bus;

the processor is configured to obtain discovery information, where the discovery information is information that the user equipment needs to send to other user equipment by means of direct communication between devices;

the processor is further configured to generate request information according to the discovery information, where the request information is used to request a base station to allocate, to the user equipment, a time-frequency resource used to send the discovery information;

the transmitter is configured to send the request information generated by the processor to the base station;

the receiver is configured to receive resource information sent by the base station, where the resource information includes the effective time-frequency resource, and the effective time-frequency resource is a time-frequency resource that is allocated by the base station to the user equipment and used to send the discovery information; and the transmitter is further configured to send the discovery information to the other user equipment by using the effective time-frequency resource received by the receiver.

With reference to the third aspect, in a first possible implementation manner, the processor is specifically configured to: determine a sending period of the discovery information and sending duration of the discovery information according to the discovery information, and generate the request information, where the request information includes the sending period of the discovery information and the sending duration of the discovery information.

With reference to the first possible implementation manner of the third aspect, in a second possible implementation manner, the resource information further includes a preset period and preset duration, where the preset period and the preset duration are a period and duration occupied by the effective time-frequency resource allocated by the base station to the user equipment; and the transmitter is specifically configured to: match the discovery information and the time-frequency resource of the discovery information, and send the discovery information to the other user equipment according to the preset period and the preset duration.

With reference to the third aspect or either of the first to the second possible implementation manners of the third aspect, in a third possible implementation manner, the transmitter is specifically configured to send the request information to the base station by carrying the request information in a radio resource control RRC message or a buffer status report BSR message.

According to a fourth aspect, a base station applied to a device-to-device technology is provided, including a processor, a memory, a transmitter, a receiver, and a bus, where the processor, the memory, the transmitter, and the receiver are connected to each other by using the bus;

the receiver is configured to receive request information sent by user equipment, where the request information is used to request the base station to allocate, to the user equipment, a time-frequency resource used to send discovery information, and the discovery information is information that the user equipment needs to send to other user equipment by means of direct communication between devices;

the processor is configured to: allocate, to the user equipment according to the request information received by the receiver, the time-frequency resource used to send the discovery information, and generate resource information, where the resource information includes the effective time-frequency resource, and the effective time-frequency resource is a time-frequency resource that is allocated by the base station to the user equipment and used to send the discovery information; and the transmitter is configured to send the resource information generated by the processor to the user equipment.

With reference to the fourth aspect, in a first possible implementation manner, the request information includes a sending period of the discovery information and sending duration of the discovery information; and the processor is specifically configured to: allocate, to the user equipment according to the request information, the time-frequency resource used to send the discovery information, determine a preset period and preset duration according to the sending period of the discovery information and the sending duration of the discovery information, and generate the resource information, where the resource information includes the effective time-frequency resource, the preset period, and the preset duration; the effective time-frequency resource is a time-frequency resource that is allocated by the base station to the user equipment and used to send the discovery information; and the preset period and the preset duration are a period and duration occupied by the effective time-frequency resource allocated by the base station to the user equipment.

With reference to the fourth aspect or the first possible implementation manner of the fourth aspect, in a second possible implementation manner, the transmitter is specifically configured to: send the resource information to the user equipment by carrying the resource information in a radio resource control RRC message, or send the resource information to the user equipment by carrying the resource information on a physical downlink control channel PDCCH.

According to a fifth aspect, an information transmission method applied to a device-to-device technology is provided, including:
- obtaining, by user equipment, discovery information, where the discovery information is information that the user equipment needs to send to other user equipment by means of direct communication between devices;
- generating, by the user equipment, request information according to the discovery information, where the request information is used to request a base station to allocate, to the user equipment, a time-frequency resource used to send the discovery information;
- sending, by the user equipment, the request information to the base station;
- receiving, by the user equipment, resource information sent by the base station, where the resource information includes the effective time-frequency resource, and the effective time-frequency resource is a time-frequency resource that is allocated by the base station to the user equipment and used to send the discovery information; and
- sending, by the user equipment, the discovery information to the other user equipment by using the effective time-frequency resource.

With reference to the fifth aspect, in a first possible implementation manner, the generating, by the user equipment, request information according to the discovery information includes:
- determining, by the user equipment, a sending period of the discovery information and sending duration of the discovery information according to the discovery information, and generating the request information, where the request information includes the sending period of the discovery information and the sending duration of the discovery information.

With reference to the first possible implementation manner of the fifth aspect, in a second possible implementation manner,
- the resource information further includes a preset period and preset duration, where the preset period and the preset duration are a period and duration occupied by the effective time-frequency resource allocated by the base station to the user equipment; and
- the sending, by the user equipment, the discovery information to the other user equipment by using the effective time-frequency resource includes:
- performing, by the user equipment, matching between the discovery information and the time-frequency resource of the discovery information, and sending the discovery information to the other user equipment according to the preset period and the preset duration.

With reference to the fifth aspect or either of the first to the second possible implementation manners of the fifth aspect, in a third possible implementation manner, the sending, by the user equipment, the request information to the base station includes:
- sending, by the user equipment, the request information to the base station by carrying the request information in a radio resource control RRC message or a buffer status report BSR message.

According to a sixth aspect, an information transmission method applied to a device-to-device technology is provided, including:
- receiving, by a base station, request information sent by user equipment, where the request information is used to request the base station to allocate, to the user equipment, a time-frequency resource used to send discovery information, and the discovery information is information that the user equipment needs to send to other user equipment by means of direct communication between devices;
- allocating, by the base station to the user equipment according to the request information, the time-frequency resource used to send the discovery information, and generating resource information, where the resource information includes the effective time-frequency resource, and the effective time-frequency resource is a time-frequency resource that is allocated by the base station to the user equipment and used to send the discovery information; and
- sending, by the base station, the resource information to the user equipment.

With reference to the sixth aspect, in a first possible implementation manner,
- the request information includes a sending period of the discovery information and sending duration of the discovery information; and
- the allocating, by the base station to the user equipment according to the request information, the time-frequency resource used to send the discovery information, and generating resource information includes:
- allocating, by the base station to the user equipment according to the request information, the time-frequency resource used to send the discovery information, determining a preset period and preset duration according to the sending period of the discovery information and the sending duration of the discovery information, and generating the resource information, where the resource information includes the effective time-frequency resource, the preset period, and the preset duration; the effective time-frequency resource is a time-frequency resource that is allocated by the base station to the user equipment and used to send the discovery information; and the preset period and the preset duration are a period and duration occupied by the effective time-frequency resource allocated by the base station to the user equipment.

With reference to the sixth aspect or the first possible implementation manner of the sixth aspect, in a second possible implementation manner, the sending, by the base station, the resource information to the user equipment includes:
- sending, by the base station, the resource information to the user equipment by carrying the resource information in a radio resource control RRC message; or sending the resource information to the user equipment by carrying the resource information on a physical downlink control channel PDCCH.

According to a seventh aspect, a wireless communications system is provided, including user equipment and a base station, where
- the user equipment is the user equipment described in the first aspect or any possible implementation manner of the first aspect; and
- the base station is the base station described in the second aspect or any possible implementation manner of the second aspect; or
- the user equipment is the user equipment described in the third aspect or any possible implementation manner of the third aspect; and the base station is the base station described in the fourth aspect or any possible implementation manner of the fourth aspect.

In the information transmission method, the device, and the system that are provided by the embodiments of the present invention, request information used to request to allocate a time-frequency resource is generated by user equipment and sent to a base station, the base station allocates an effective time-frequency resource to the user equipment according to the request information, and then the user equipment sends discovery information by using the allocated effective time-frequency resource. The base station uniformly allocates time-frequency resources, so that a problem of inappropriate time-frequency resource allocation in a device-to-device technology is resolved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
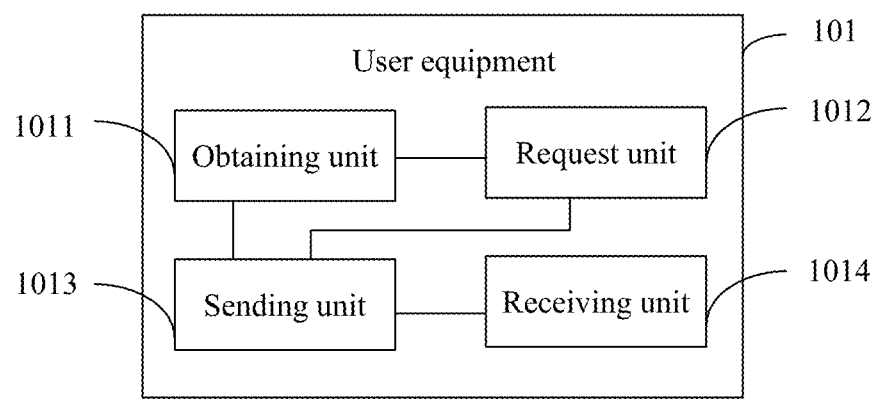
FIG. 1 is a schematic structural diagram of user equipment according to an embodiment of the present invention.

An embodiment of the present invention provides user equipment 101 applied to a device-to-device technology. As shown in FIG. 1, the user equipment 101 includes an obtaining unit 1011, a request unit 1012, a sending unit 1013, and a receiving unit 1014.

The obtaining unit 1011 is configured to obtain discovery information, where the discovery information is information that the user equipment needs to send to other user equipment by means of direct communication between devices.

The request unit 1012 is configured to generate request information according to the discovery information obtained by the obtaining unit 1011, where the request information is used to request a base station to allocate, to the user equipment, a time-frequency resource used to send the discovery information.

The sending unit 1013 is configured to send the request information generated by the request unit 1012 to the base station.

The receiving unit 1014 is configured to receive resource information sent by the base station, where the resource information includes an effective time-frequency resource, and the effective time-frequency resource is a time-frequency resource that is allocated by the base station to the user equipment and used to send the discovery information.

The sending unit 1013 is further configured to send the discovery information to the other user equipment by using the effective time-frequency resource received by the receiving unit 1014.

The user equipment provided by this embodiment of the present invention obtains discovery information, generates request information according to the discovery information, sends the request information to a base station, receives resource information sent by the base station, and sends the discovery information to other user equipment by using an effective time-frequency resource. The base station uniformly allocates time-frequency resources, so that a problem of inappropriate time-frequency resource allocation in a device-to-device technology is resolved.

Optionally, the request unit 1012 is specifically configured to: determine a sending period of the discovery information and sending duration of the discovery information according to the discovery information, and generate the request information, where the request information includes the sending period of the discovery information and the sending duration of the discovery information.

The resource information further includes a preset period and preset duration, where the preset period and the preset duration are a period and duration occupied by the effective time-frequency resource allocated by the base station to the user equipment.

The sending unit 1013 is specifically configured to: match the discovery information and the time-frequency resource of the discovery information, and send the discovery information to the other user equipment according to the preset period and the preset duration.

Optionally, the sending unit 1013 is specifically configured to send the request information to the base station by carrying the request information in a radio resource control RRC message or a buffer status report BSR message.

The user equipment provided by this embodiment of the present invention obtains discovery information, generates request information according to the discovery information, sends the request information to a base station, receives resource information sent by the base station, and sends the discovery information to other user equipment by using an effective time-frequency resource. The base station uniformly allocates time-frequency resources, so that a problem of inappropriate time-frequency resource allocation in a device-to-device technology is resolved.

Figure 2:
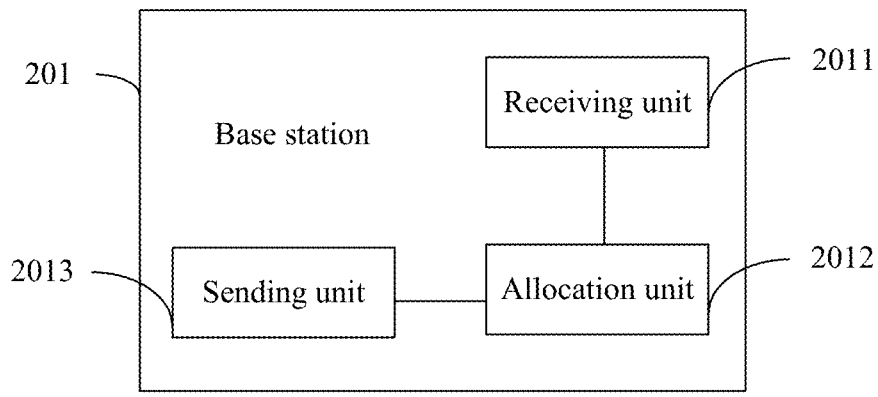
FIG. 2 is a schematic structural diagram of a base station according to an embodiment of the present invention.

An embodiment of the present invention provides a base station applied to a device-to-device technology. As shown in FIG. 2, the base station 201 includes a receiving unit 2011, an allocation unit 2012, and a sending unit 2013.

The receiving unit 2011 is configured to receive request information sent by user equipment, where the request information is used to request the base station to allocate, to the user equipment, a time-frequency resource used to send discovery information, and the discovery information is information that the user equipment needs to send to other user equipment by means of direct communication between devices.

The allocation unit 2012 is configured to: allocate, to the user equipment according to the request information received by the receiving unit 2011, the time-frequency resource used to send the discovery information, and generate resource information, where the resource information includes an effective time-frequency resource, and the effective time-frequency resource is a time-frequency resource that is allocated by the base station to the user equipment and used to send the discovery information.

The sending unit 2013 is configured to send the resource information generated by the allocation unit 2012 to the user equipment.

The base station provided by this embodiment of the present invention receives request information sent by user equipment, allocates, to the user equipment according to the request information, a time-frequency resource used to send discovery information, generates resource information, and sends the resource information to the user equipment. The base station uniformly allocates time-frequency resources, so that a problem of inappropriate time-frequency resource allocation in a device-to-device technology is resolved.

Optionally, the request information includes a sending period of the discovery information and sending duration of the discovery information.

The allocation unit 2012 is specifically configured to: allocate, to the user equipment according to the request information, the time-frequency resource used to send the discovery information, determine a preset period and preset duration according to the sending period of the discovery information and the sending duration of the discovery information, and generate the resource information, where the resource information includes the effective time-frequency resource, the preset period, and the preset duration; the effective time-frequency resource is a time-frequency resource that is allocated by the base station to the user equipment and used to send the discovery information; and the preset period and the preset duration are a period and duration occupied by the effective time-frequency resource allocated by the base station to the user equipment.

Optionally, the sending unit 2013 is specifically configured to: send the resource information to the user equipment by carrying the resource information in a radio resource control RRC message, or send the resource information to the user equipment by carrying the resource information on a physical downlink control channel PDCCH.

The base station provided by this embodiment of the present invention receives request information sent by user equipment, allocates, to the user equipment according to the request information, a time-frequency resource used to send discovery information, generates resource information, and sends the resource information to the user equipment. The base station uniformly allocates time-frequency resources, so that a problem of inappropriate time-frequency resource allocation in a device-to-device technology is resolved.

Figure 3:
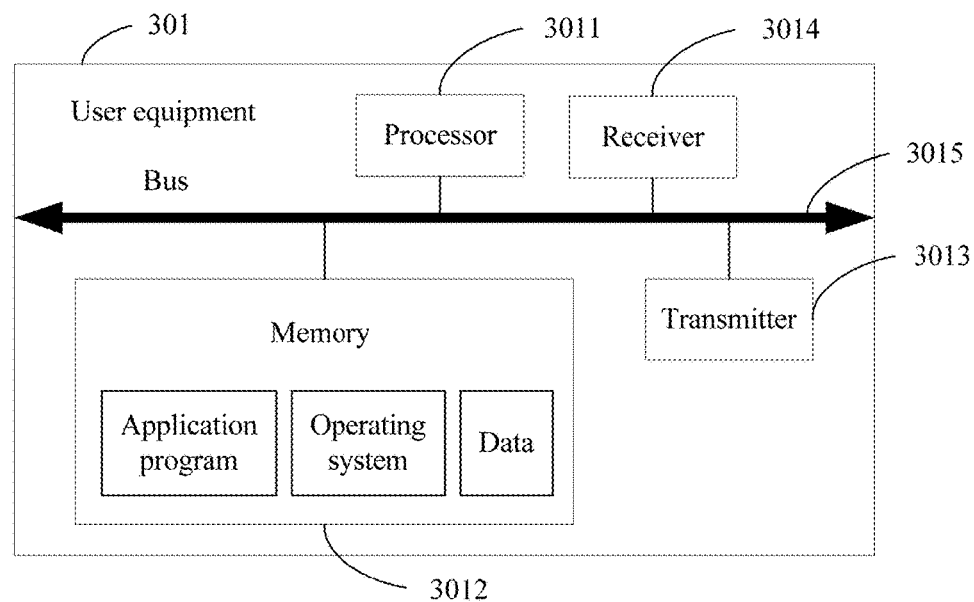
FIG. 3 is a schematic structural diagram of user equipment according to another embodiment of the present invention.

Another embodiment of the present invention provides user equipment 301. As shown in FIG. 3, the device may be built in or is a microcomputer, for example, a general-purpose computer, a customized computer, or a portable device such as a mobile phone terminal or a tablet computer. The user equipment 301 includes: at least one processor 3011, a memory 3012, a transmitter 3013, a receiver 3014, and a bus 3015, where the at least one processor 3011, the memory 3012, the transmitter 3013, and the receiver 3014 are connected and implement mutual communication by using the bus 3015.

The bus 3015 may be an ISA (industry standard architecture) bus, a PCI (peripheral component interconnect) bus, an EISA (extended industry standard architecture) bus, or the like. The bus 3015 may be categorized into an address bus, a data bus, a control bus, and the like. For ease of denotation, the bus is indicated by using only one thick line in FIG. 3; however, it does not mean that there is only one bus or only one type of bus.

The memory 3012 is configured to store application program code that executes the solutions of the present invention. The application program code that executes the solutions of the present invention is stored in the memory, and execution thereof is controlled by the processor 3011.

The memory may be a read-only memory ROM or another type of static storage device that may store static information and instructions, a random access memory RAM or another type of dynamic storage device that may store information and instructions, and may further be an electrically erasable programmable read-only memory EEPROM, a compact disc read-only memory CD-ROM, or another compact disk storage, optical disc (including a compact disc, a laser disc, an optical disc, a digital versatile disc, a blue-ray disc, and the like) storage, or disk storage medium, or another disk storage device, or any another medium that can be used to carry or store expected program code in a command or data structure form and can be accessed by a computer, which, however, is not limited herein. The memory is connected to the processor by using the bus.

The processor 3011 may be a central processing unit (CPU for short), or an application specific integrated circuit (ASIC for short), or one or more integrated circuits configured to implement this embodiment of the present invention.

The processor 3011 is configured to invoke the program code in the memory 3012 to implement the following functions in a possible implementation manner:

The processor 3011 is configured to obtain discovery information, where the discovery information is information that the user equipment needs to send to other user equipment by means of direct communication between devices.

The processor 3011 is further configured to generate request information according to the discovery information, where the request information is used to request a base station to allocate, to the user equipment, a time-frequency resource used to send the discovery information.

The transmitter 3013 is configured to send the request information generated by the processor 3011 to the base station.

The receiver 3014 is configured to receive resource information sent by the base station, where the resource information includes an effective time-frequency resource, and the effective time-frequency resource is a time-frequency resource that is allocated by the base station to the user equipment and used to send the discovery information.

The transmitter 3013 is further configured to send the discovery information to the other user equipment by using the effective time-frequency resource received by the receiver 3014.

The user equipment provided by this embodiment of the present invention obtains discovery information, generates request information according to the discovery information, sends the request information to a base station, receives resource information sent by the base station, and sends the discovery information to other user equipment by using an effective time-frequency resource. The base station uniformly allocates time-frequency resources, so that a problem of inappropriate time-frequency resource allocation in a device-to-device technology is resolved.

Optionally, the processor 3011 is specifically configured to: determine a sending period of the discovery information and sending duration of the discovery information according to the discovery information, and generate the request information, where the request information includes the sending period of the discovery information and the sending duration of the discovery information.

The resource information further includes a preset period and preset duration, where the preset period and the preset duration are a period and duration occupied by the effective time-frequency resource allocated by the base station to the user equipment.

The transmitter 3013 is specifically configured to: match the discovery information and the time-frequency resource of the discovery information, and send the discovery information to the other user equipment according to the preset period and the preset duration.

Optionally, the transmitter 3013 is specifically configured to send the request information to the base station by carrying the request information in a radio resource control RRC message or a buffer status report BSR message.

The user equipment provided by this embodiment of the present invention obtains discovery information, generates request information according to the discovery information, sends the request information to a base station, receives resource information sent by the base station, and sends the discovery information to other user equipment by using an effective time-frequency resource. The base station uniformly allocates time-frequency resources, so that a problem of inappropriate time-frequency resource allocation in a device-to-device technology is resolved.

Figure 4:
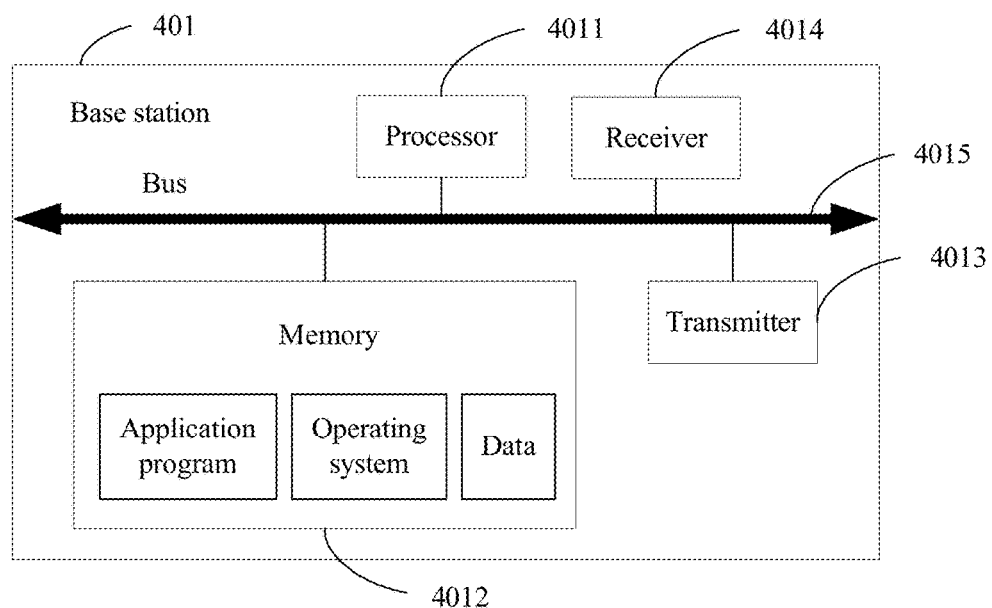
FIG. 4 is a schematic structural diagram of a base station according to another embodiment of the present invention.

Another embodiment of the present invention provides a base station 401. As shown in FIG. 4, the device may be built in or is a microcomputer, for example, a general-purpose computer, a customized computer, or a portable device such as a mobile phone terminal or a tablet computer. The base station 401 includes: at least one processor 4011, a memory 4012, a transmitter 4013, a receiver 4014, and a bus 4015, where the at least one processor 4011, the memory 4012, the transmitter 4013, and the receiver 4014 are connected and implement mutual communication by using the bus 4015.

The bus 4015 may be an ISA (industry standard architecture) bus, a PCI (peripheral component interconnect) bus, an EISA (extended industry standard architecture) bus, or the like. The bus 4015 may be categorized into an address bus, a data bus, a control bus, and the like. For ease of denotation, the bus is indicated by using only one thick line in FIG. 4; however, it does not mean that there is only one bus or only one type of bus.

The memory 4012 is configured to store application program code that executes the solutions of the present invention. The application program code that executes the solutions of the present invention is stored in the memory, and execution thereof is controlled by the processor 4011.

The memory may be a read-only memory ROM or another type of static storage device that may store static information and instructions, a random access memory RAM or another type of dynamic storage device that may store information and instructions, and may further be an electrically erasable programmable read-only memory EEPROM, a compact disc read-only memory CD-ROM, or another compact disk storage, optical disc (including a compact disc, a laser disc, an optical disc, a digital versatile disc, a blue-ray disc, and the like) storage, or disk storage medium, or another disk storage device, or any another medium that can be used to carry or store expected program code in a command or data structure form and can be accessed by a computer, which, however, is not limited herein. The memory is connected to the processor by using the bus.

The processor 4011 may be a central processing unit 4011 (CPU for short), or an application specific integrated circuit (ASIC for short), or one or more integrated circuits configured to implement this embodiment of the present invention.

The processor 4011 is configured to invoke the program code in the memory 4012 to implement the following functions in a possible implementation manner:

The receiver 4014 is configured to receive request information sent by user equipment, where the request information is used to request the base station to allocate, to the user equipment, a time-frequency resource used to send discovery information, and the discovery information is information that the user equipment needs to send to other user equipment by means of direct communication between devices.

The processor 4011 is configured to: allocate, to the user equipment according to the request information received by the receiver 4014, the time-frequency resource used to send the discovery information, and generate resource information, where the resource information includes an effective time-frequency resource, and the effective time-frequency resource is a time-frequency resource that is allocated by the base station to the user equipment and used to send the discovery information.

The transmitter 4013 is configured to send the resource information generated by the processor 4011 to the user equipment.

The base station provided by this embodiment of the present invention receives request information sent by user equipment, allocates, to the user equipment according to the request information, a time-frequency resource used to send discovery information, generates resource information, and sends the resource information to the user equipment. The base station uniformly allocates time-frequency resources, so that a problem of inappropriate time-frequency resource allocation in a device-to-device technology is resolved.

Optionally, the request information includes a sending period of the discovery information and sending duration of the discovery information.

The processor 4011 is specifically configured to: allocate, to the user equipment according to the request information, the time-frequency resource used to send the discovery information, determine a preset period and preset duration according to the sending period of the discovery information and the sending duration of the discovery information, and generate the resource information, where the resource information includes the effective time-frequency resource, the preset period, and the preset duration; the effective time-frequency resource is a time-frequency resource that is allocated by the base station to the user equipment and used to send the discovery information; and the preset period and the preset duration are a period and duration occupied by the effective time-frequency resource allocated by the base station to the user equipment.

Optionally, the transmitter 4013 is specifically configured to: send the resource information to the user equipment by carrying the resource information in a radio resource control RRC message, or send the resource information to the user equipment by carrying the resource information on a physical downlink control channel PDCCH.

The base station provided by this embodiment of the present invention receives request information sent by user equipment, allocates, to the user equipment according to the request information, a time-frequency resource used to send discovery information, generates resource information, and sends the resource information to the user equipment. The base station uniformly allocates time-frequency resources, so that a problem of inappropriate time-frequency resource allocation in a device-to-device technology is resolved.

Figure 5:
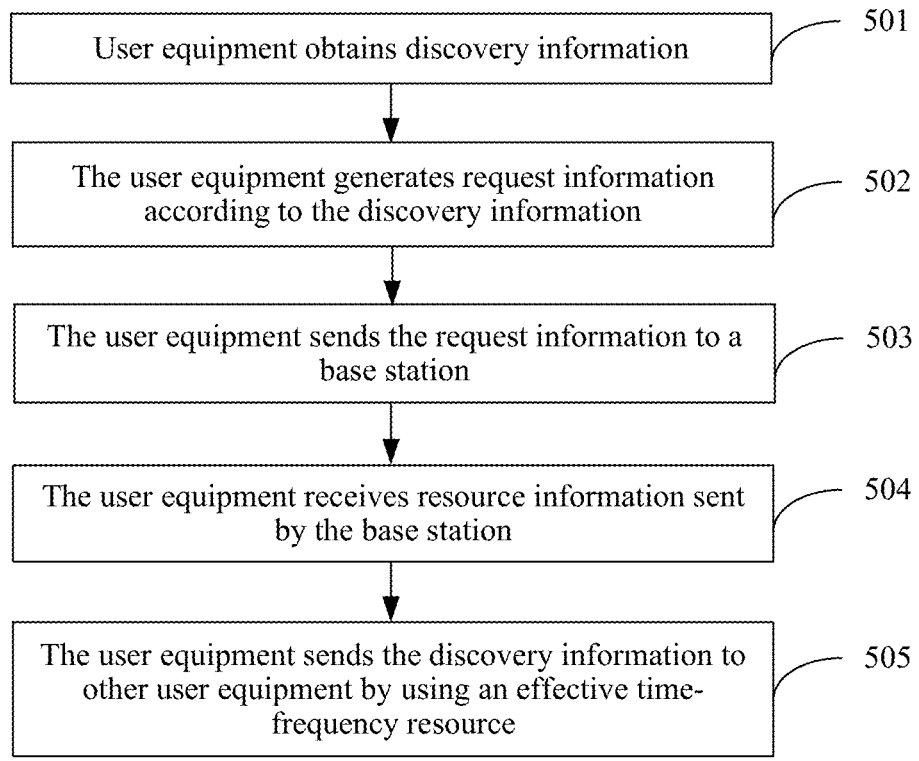
FIG. 5 is a schematic flowchart of an information transmission method according to an embodiment of the present invention.

An embodiment of the present invention provides an information transmission method applied to a device-to-device technology. As shown in FIG. 5, the method includes the following steps:

501. User equipment obtains discovery information.

The discovery information is information that the user equipment needs to send to other user equipment by means of direct communication between devices.

502. The user equipment generates request information according to the discovery information.

The request information is used to request a base station to allocate, to the user equipment, a time-frequency resource used to send the discovery information.

Optionally, the request information includes a sending period and sending duration, where the sending period represents frequency of sending the discovery information, that is, the discovery information is sent once in one period, and the sending duration is a total time that needs to be consumed to complete sending of the discovery information according to the sending period.

Optionally, the request information may include requests of multiple pieces of discovery information, and each piece of discovery information has a different sending period and sending duration; or the multiple pieces of discovery information have a same sending period and sending duration.

503. The user equipment sends the request information to a base station.

Optionally, the user equipment sends the request information to the base station by carrying the request information in an RRC (radio resource control) message or a BSR (buffer status report) message.

504. The user equipment receives resource information sent by the base station.

The resource information includes an effective time-frequency resource, where the effective time-frequency resource is a time-frequency resource that is allocated by the base station to the user equipment and used to send the discovery information. Optionally, the resource information may further include a preset period and preset duration, where the preset period and the preset duration are a period and duration occupied by the effective time-frequency resource allocated by the base station to the user equipment. The preset period represents frequency of sending the discovery information by using the effective time-frequency resource, that is, the discovery information is sent once in one period, and the preset duration represents a time in which the discovery information is sent according to the preset period by using the effective time-frequency resource. For example, the discovery information is sent once in one second when the preset period is one second, and the preset duration being 500 seconds represents that the discovery information is sent once in one second continuously in 500 seconds.

505. The user equipment sends the discovery information to other user equipment by using an effective time-frequency resource.

Optionally, the user equipment performs matching between the discovery information and the effective time-frequency resource, and sends the discovery information to the other user equipment after the matching is completed.

Optionally, there are two matching methods when the request information includes requests of multiple pieces of discovery information: (1) Matching is performed according to correspondences between a sending period of discovery information and a preset period and between sending duration of the discovery information and preset duration. A preset period and preset duration that are included in resource information sent by the base station are generated according to a sending period of discovery information and sending duration of the discovery information that are included in the request information. If a preset period and preset duration that are of the effective time-frequency resource are respectively the same as a sending period of discovery information and sending duration of the discovery information, it may be determined that the effective time-frequency resource and the discovery information correspond to each other; or when differences between a preset period of the effective time-frequency resource and a sending period of discovery information and between preset duration of the effective time-frequency resource and sending duration of the discovery information are smallest, the effective time-frequency resource and the discovery information correspond to each other.

(2) When the request information includes requests of multiple pieces of discovery information, an identifier is added to each piece of discovery information, and an effective time-frequency resource allocated to the discovery information has a same identifier with the discovery information. In this way, discovery information and an effective time-frequency resource that have a same identifier correspond to each other, so that matching between an effective time-frequency resource and discovery information is accomplished.

Optionally, the user equipment determines, according to the effective time-frequency resource, a time-frequency resource that needs to be occupied to send the discovery information. The resource information may further include a preset period and preset duration. The user equipment sends the discovery information according to the preset period and the preset duration by using the effective time-frequency resource.

In the information transmission method provided by this embodiment of the present invention, user equipment obtains discovery information, generates request information according to the discovery information, sends the request information to a base station, receives resource information sent by the base station, and sends the discovery information to other user equipment by using an effective time-frequency resource. The base station uniformly allocates time-frequency resources, so that a problem of inappropriate time-frequency resource allocation in a device-to-device technology is resolved.

Figure 6:
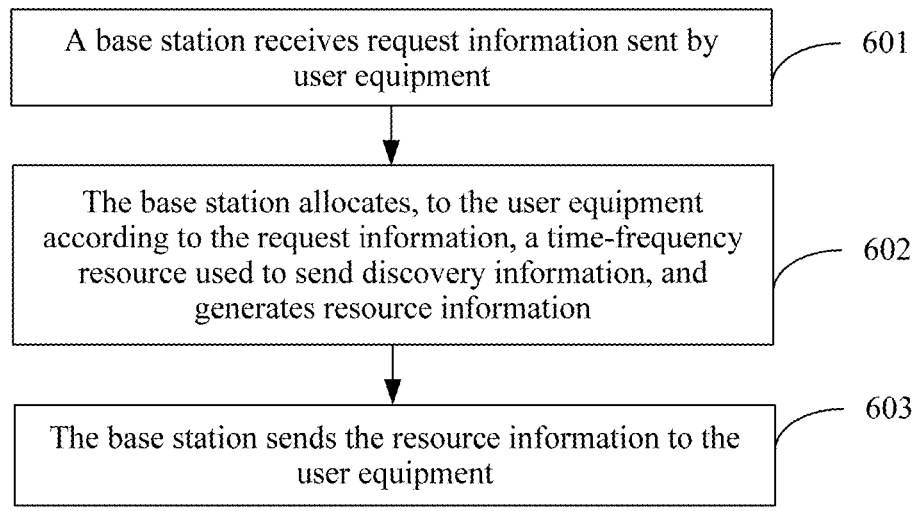
FIG. 6 is a schematic flowchart of another information transmission method according to an embodiment of the present invention.

An embodiment of the present invention provides another information transmission method applied to a device-to-device technology. As shown in FIG. 6, the method includes the following steps:

601. A base station receives request information sent by user equipment.

Optionally, the request information includes a sending period of discovery information and sending duration of the discovery information, where the discovery information is information that the user equipment needs to send to other user equipment by means of direct communication between devices, the sending period represents frequency of sending the discovery information, that is, the discovery information is sent once in one period, and the sending duration is a time length in which the discovery information is sent according to the sending period.

602. The base station allocates, to the user equipment according to the request information, a time-frequency resource used to send discovery information, and generates resource information.

The resource information includes an effective time-frequency resource, where the effective time-frequency resource is a time-frequency resource that is allocated by the base station to the user equipment and used to send the discovery information.

Preferably, the base station allocates an effective time-frequency resource in idle time-frequency resources to the user equipment. Optionally, when multiple terminals send request information, the base station allocates a time-frequency resource to each terminal according to request information of each terminal, determines a preset period and preset duration that are of each terminal according to a sending period and sending duration in the request information, and generates resource information, where the resource information includes the effective time-frequency resource, the preset period, and the preset duration.

603. The base station sends the resource information to the user equipment.

Optionally, the base station sends the resource information to the user equipment by carrying the resource information in an RRC message, or sends the resource information to the user equipment by carrying the resource information on a PDCCH (physical downlink control channel).

In the information transmission method provided by this embodiment of the present invention, a base station receives request information sent by user equipment, allocates, to the user equipment according to the request information, a time-frequency resource used to send discovery information, generates resource information, and sends the resource information to the user equipment. The base station uniformly allocates time-frequency resources, so that a problem of inappropriate time-frequency resource allocation in a device-to-device technology is resolved.

Figure 7:
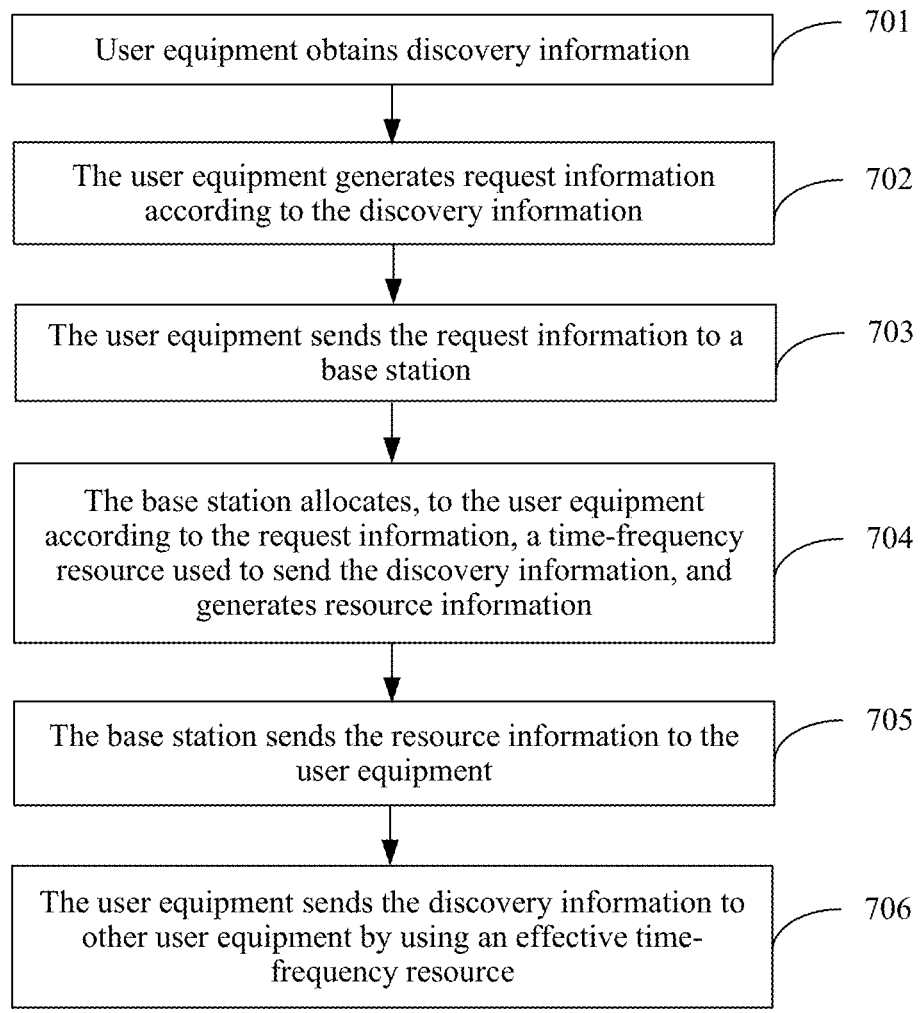
FIG. 7 is a schematic flowchart of an information transmission method according to another embodiment of the present invention.

Based on the foregoing embodiments corresponding to FIG. 5 and FIG. 6, another embodiment of the present invention provides an information transmission method applied to a device-to-device technology. Optionally, the method is applied to an LTE (Long Term Evolution) system, where in a cellular structure of the LTE system, a cellular device-to-device terminal may directly perform communication by using resources of the LTE system. As shown in FIG. 7, the method includes the following steps:

701. User equipment obtains discovery information.

Figure 8:
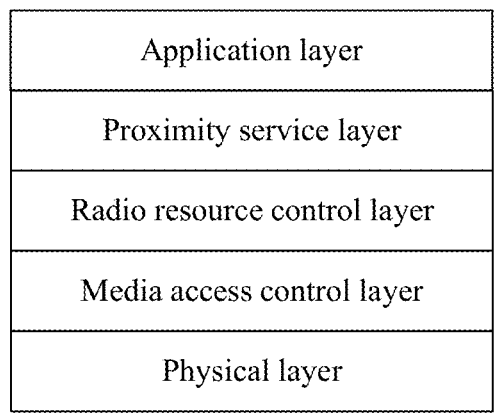
FIG. 8 is a schematic structural diagram of a user plane protocol stack according to an embodiment of the present invention.

The discovery information is information that needs to be sent by the user equipment by means of direct communication between devices. Optionally, as shown in FIG. 8, seen from a user plane protocol stack structure, a proximity service layer is added, where the proximity service layer is an interface layer between an application layer and a user access network. When an application on user equipment needs to directly send a message, that is, discovery information, to another terminal in a cellular structure, the discovery information may be sent to the proximity service layer, and the proximity service layer may generate request information according to the discovery information. The user equipment herein is a cellular device-to-device terminal in an LTE system.

702. The user equipment generates request information according to the discovery information.

The request information may include requests of multiple pieces of discovery information. Optionally, the request information includes a quantity of the discovery information, and a sending period and sending duration that are of each piece of discovery information.

703. The user equipment sends the request information to a base station.

Optionally, after an RRC layer of the user equipment receives the request information of the proximity service layer, the request information may be carried in an RRC establishment request message and sent to the base station, or the request information may be sent to the base station after an RRC link between the user equipment and the base station is established.

Alternatively and optionally, after an RRC link between the user equipment and the base station is established, the RRC link remains in a connected state, and the request information is sent to a MAC (media access control) layer. In this case, the request information may be carried in a BSR (buffer status report) message and sent to the base station.

704. The base station allocates, to the user equipment according to the request information, a time-frequency resource used to send the discovery information, and generates resource information.

The resource information includes an effective time-frequency resource, where the effective time-frequency resource is a time-frequency resource that is allocated by the base station to the user equipment and used to send the discovery information.

Optionally, the base station allocates an effective time-frequency resource in idle time-frequency resources to each piece of discovery information in the request information, determines a preset period and preset duration that are of each piece of discovery information according to the sending period of each piece of discovery information and the sending duration of the discovery information, and generates the resource information, where the resource information includes the effective time-frequency resource, the preset period, and the preset duration.

705. The base station sends the resource information to the user equipment.

706. The user equipment sends the discovery information to other user equipment by using an effective time-frequency resource.

Optionally, the user equipment performs matching between the discovery information and the effective time-frequency resource, and sends the discovery information to the other user equipment after the matching is completed.

Optionally, there are two matching methods when the request information includes requests of multiple pieces of discovery information: (1) Matching is performed according to correspondences between a sending period and a preset period and between sending duration and preset duration. A preset period and preset duration that are included in resource information sent by the base station are generated according to a sending period and sending duration that are included in the request information. If a preset period and preset duration that are of an effective time-frequency resource are respectively the same as a sending period of discovery information and sending duration of the discovery information, it may be determined that the effective time-frequency resource and the discovery information correspond to each other; or when differences between a preset period of an effective time-frequency resource and a sending period of discovery information and between preset duration of the effective time-frequency resource and sending duration of the discovery information are smallest, the effective time-frequency resource and the discovery information correspond to each other.

For example, in three effective time-frequency resources whose preset periods and preset duration are respectively "1 second and 100 seconds", "2 seconds and 500 seconds", and "3 seconds and 1500 seconds", and in three pieces of discovery information whose sending periods and sending duration are respectively "1.2 seconds and 120 seconds", "2.5 seconds and 600 seconds", and "3.5 seconds and 1800 seconds", an effective time-frequency resource whose preset period and preset duration are "1 second and 100 seconds" and discovery information whose sending period and sending duration are "1.2 seconds and 120 seconds" correspond to each other, because a difference between "1 second and 100 seconds" and "1.2 seconds and 120 seconds" is smallest, that is, "1 second and 100 seconds" and "1.2 seconds and 120 seconds" are closest.

(2) When the request information includes requests of multiple pieces of discovery information, an identifier is added to each piece of discovery information, and an effective time-frequency resource allocated to the discovery information has a same identifier with the discovery information. In this way, discovery information and an effective time-frequency resource that have a same identifier correspond to each other, so that matching between an effective time-frequency resource and discovery information is accomplished.

Seen from the user plane protocol stack structure, the proximity service layer sends the discovery information to the MAC layer of the user equipment, and then the discovery information is sent to another terminal by using a PHY (physical layer).

Optionally, the user equipment performs matching between each piece of discovery information and a corresponding resource in effective time-frequency resources, thereby avoiding inappropriate time-frequency resource allocation and an error in sending a message that result from multiple user equipments selecting a same time-frequency resource at the same time. Further and optionally, the user equipment sends the discovery information according to the preset period and the preset duration that are of each piece of discovery information.

In the information transmission method provided by this embodiment of the present invention, request information used to request to allocate a time-frequency resource is generated by user equipment and sent to a base station, the base station allocates an effective time-frequency resource to the user equipment according to the request information, and then the user equipment sends discovery information by using the allocated effective time-frequency resource. The base station uniformly allocates time-frequency resources, so that a problem of inappropriate time-frequency resource allocation in a device-to-device technology is resolved.

Figure 9:
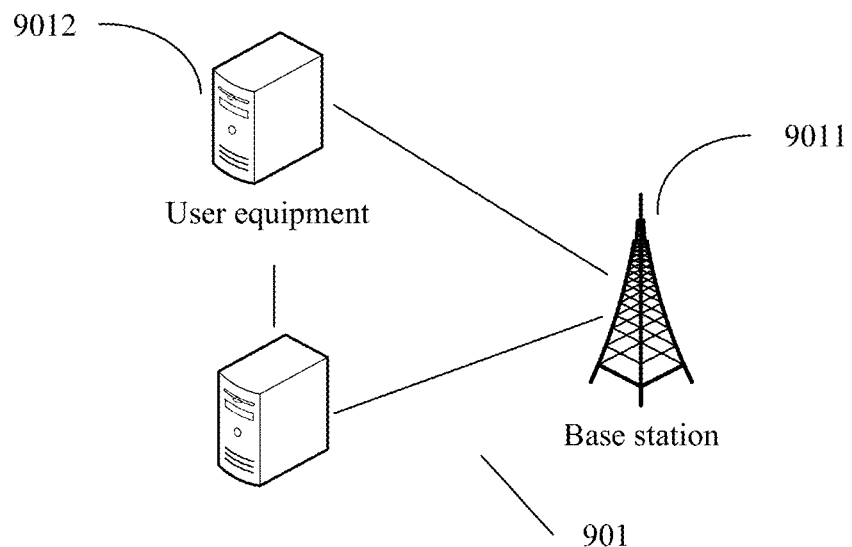
FIG. 9 is a schematic structural diagram of a wireless communications system according to an embodiment of the present invention.

An embodiment of the present invention provides a wireless communications system. As shown in FIG. 9, the wireless communications system 901 includes at least one base station 9011 and at least one user equipment 9012.

The user equipment 9012 is the user equipment described in the embodiment corresponding to FIG. 1, and is configured to execute the information transmission method described in the foregoing embodiment corresponding to FIG. 5; the base station 9011 is the base station described in the embodiment corresponding to FIG. 2, and is configured to execute the information transmission method described in the foregoing embodiment corresponding to FIG. 6.

Alternatively, the user equipment 9012 is the user equipment described in the embodiment corresponding to FIG. 3, and is configured to execute the information transmission method described in the foregoing embodiment corresponding to FIG. 5; the base station 9011 is the base station described in the embodiment corresponding to FIG. 4, and is configured to execute the information transmission method described in the foregoing embodiment corresponding to FIG. 6.

In the wireless communications system provided by this embodiment of the present invention, request information used to request to allocate a time-frequency resource is generated by user equipment and sent to a base station, the base station allocates an effective time-frequency resource to the user equipment according to the request information, and then the user equipment sends discovery information by using the allocated effective time-frequency resource. The base station uniformly allocates time-frequency resources, so that a problem of inappropriate time-frequency resource allocation in a device-to-device technology is resolved.

With descriptions of the foregoing embodiments, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer readable medium may include a RAM (random access memory), a ROM (read-only memory), an EEPROM (electrically erasable programmable read-only memory), a CD-ROM (compact disc read-only memory), or another optical disc storage or disk storage medium, or another magnetic storage device, or any other medium that can be used to carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber cable, a twisted pair, a DSL (digital subscriber line) or wireless technologies such as infrared ray, radio and microwave, the coaxial cable, optical fiber cable, twisted pair, DSL or wireless technologies such as infrared ray, radio and microwave are included in fixation of a medium to which they belong. For example, a disk and a disc used by the present invention includes a CD (compact disc), a laser disc, an optical disc, a DVD disc (digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A user equipment for a device-to-device technology, the user equipment comprising:
a memory configured to store an instruction;
a processor configured to execute the instruction stored in the memory, to obtain discovery information, wherein the discovery information is information that the user equipment is to send to other user equipment by means of direct communication between devices, and to generate request information according to the discovery information, wherein the request information is used to request a base station to allocate, to the user equipment, a time-frequency resource used to send the discovery information, and wherein the request information includes a sending period to be used by the user equipment to send the discovery information and a sending duration to be used by the user equipment to send the discovery information;
a receiver configured to receive resource information sent by the base station in response to the request information being sent from the user equipment to the base station, wherein the resource information includes an effective time-frequency resource, and the effective time-frequency resource is the time-frequency resource used by the user equipment to send the discovery information and that is allocated by the base station to the user equipment; and
a transmitter configured to send the request information generated by the processor to the base station and to send the discovery information to the other user equipment by using the effective time-frequency resource received by the receiver.

2. The device according to claim 1, wherein
the processor is configured to: determine the sending period of the discovery information and the sending duration of the discovery information according to the discovery information.

3. The device according to claim 2, wherein
the resource information further includes a preset period and a preset duration, wherein the preset period and the preset duration are a period and a duration occupied by the effective time-frequency resource allocated by the base station to the user equipment; and
the transmitter is configured to: match the discovery information and the time-frequency resource of the discovery information, and send the discovery information to the other user equipment according to the preset period and the preset duration.

4. The device according to claim 1, wherein
the transmitter is configured to send the request information to the base station by carrying the request information in a radio resource control message or a buffer status report message.

5. The device according to claim 1, wherein
the resource information further includes a preset period and a preset duration, wherein the preset period and the preset duration are a period and a duration occupied by the effective time-frequency resource allocated by the base station to the user equipment, and
the processor is configured to determine a first difference between the preset period of the resource information and the sending period of the request information and to determine a second difference between the preset duration of the resource information and the sending duration of the request information, and to determine a correspondence between the effective time-frequency resource and the discovery information based on the first and second differences.

6. A base station for a device-to-device technology, comprising:
a memory configured to store an instruction;
a receiver configured to receive request information sent by user equipment, wherein the request information is used to request the base station to allocate, to the user equipment, a time-frequency resource used to send discovery information, wherein the request information includes a sending period to be used by the user equipment to send the discovery information and a sending duration to be used by the user equipment to send the discovery information, and the discovery information is information that the user equipment needs to send to other user equipment by direct communication between devices;
a processor configured to: execute the instruction stored in the memory, allocate, to the user equipment according to the request information received by the receiver, the time-frequency resource used to send the discovery information, and generate resource information, wherein the resource information includes an effective time-frequency resource, and the effective time-frequency resource is the time-frequency resource used to send the discovery information that is allocated by the base station to the user equipment; and
a transmitter configured to send the resource information generated by the processor to the user equipment.

7. The device according to claim 6, wherein
the processor is configured to: allocate, to the user equipment according to the request information, the time-frequency resource used to send the discovery information, determine a preset period and a preset duration according to the sending period of the discovery information and the sending duration of the discovery information, and generate the resource information, wherein the resource information includes the effective time-frequency resource, the preset period, and the preset duration, and
the preset period and the preset duration are a period and a duration occupied by the effective time-frequency resource allocated by the base station to the user equipment.

8. The device according to claim 6, wherein
the transmitter is configured to: send the resource information to the user equipment by carrying the resource information in a radio resource control message, or send the resource information to the user equipment by carrying the resource information on a physical downlink control channel.

9. The base station according to claim 6, wherein
the processor is configured to generate a preset period and a preset duration based on the sending period and the sending duration included in the request information, and to generate the request information which includes the effective time-frequency resource, the preset period, and the preset duration.

10. An information transmission method for a device-to-device technology, the method comprising:
- obtaining, by a user equipment, discovery information, wherein the discovery information is information that the user equipment needs to send to other user equipment by direct communication between devices;
- generating, by the user equipment, request information according to the discovery information, wherein the request information is used to request a base station to allocate, to the user equipment, a time-frequency resource used to send the discovery information, and wherein the request information includes a sending period to be used by the user equipment to send the discovery information and a sending duration to be used by the user equipment to send the discovery information;
- sending, by the user equipment, the request information to the base station;
- receiving, by the user equipment, resource information sent by the base station in response to the request information being sent from the user equipment to the base station, wherein the resource information includes an effective time-frequency resource, and the effective time-frequency resource is the time-frequency resource used to send the discovery information that is allocated by the base station to the user equipment; and
- sending, by the user equipment, the discovery information to the other user equipment by using the effective time-frequency resource.

11. The method according to claim 10, wherein the generating, by the user equipment, request information according to the discovery information comprises:
- generating the request information, wherein the request information includes the sending period of the discovery information and the sending duration of the discovery information.

12. The method according to claim 11, wherein
- the resource information further includes a preset period and a preset duration, wherein the preset period and the preset duration are a period and a duration occupied by the effective time-frequency resource allocated by the base station to the user equipment; and
- the sending, by the user equipment, the discovery information to the other user equipment by using the effective time-frequency resource comprises:
- performing, by the user equipment, matching between the discovery information and the time-frequency resource of the discovery information, and sending the discovery information to the other user equipment according to the preset period and the preset duration.

13. The method according to claim 10, wherein the sending, by the user equipment, the request information to the base station comprises:
- sending, by the user equipment, the request information to the base station by carrying the request information in a radio resource control message or a buffer status report BSR message.

14. An information transmission method for a device-to-device technology, the method comprising:
- receiving, by a base station, request information sent by a user equipment, wherein the request information is used to request the base station to allocate, to the user equipment, a time-frequency resource used to send discovery information, the discovery information is information that the user equipment needs to send to other user equipment by direct communication between devices, and the request information includes a sending period to be used by the user equipment to send the discovery information and a sending duration to be used by the user equipment to send the discovery information;
- allocating, by the base station to the user equipment according to the request information, the time-frequency resource used to send the discovery information, and generating resource information, wherein the resource information includes an effective time-frequency resource, and the effective time-frequency resource is the time-frequency resource that is allocated by the base station to the user equipment and used to send the discovery information; and
- sending, by the base station, the resource information to the user equipment.

15. The method according to claim 14, wherein
- the allocating, by the base station to the user equipment according to the request information, the time-frequency resource used to send the discovery information, and generating resource information comprises:
- allocating, by the base station to the user equipment according to the request information, the time-frequency resource used to send the discovery information, determining a preset period and a preset duration according to the sending period of the discovery information and the sending duration of the discovery information, and generating the resource information, wherein the resource information includes the effective time-frequency resource, the preset period, and the preset duration,
- wherein the preset period and the preset duration are a period and a duration occupied by the effective time-frequency resource allocated by the base station to the user equipment.

16. The method according to claim 14, wherein the sending, by the base station, the resource information to the user equipment comprises:
- sending, by the base station, the resource information to the user equipment by carrying the resource information in a radio resource control message, or sending the resource information to the user equipment by carrying the resource information on a physical downlink control channel.

17. A wireless communications system, comprising:
- a base station communicating with a user equipment, wherein
- the base station comprises:
  - a memory configured to store an instruction;
  - a receiver configured to receive request information sent by the user equipment, wherein the request information is used to request the base station to allocate, to the user equipment, a time-frequency resource used to send discovery information, the request information includes a sending period to be used by the user equipment to send the discovery information and a sending duration to be used by the user equipment to send the discovery information, and the discovery information is information that the user equipment is to send to other user equipment by direct communication between devices;
  - a processor configured to: execute the instruction stored in the memory, allocate, to the user equipment according to the request information received by the receiver, the time-frequency resource used to send the discovery information, and generate resource information, wherein the resource information includes an effective time-frequency resource, and the effective time-frequency resource is the time-frequency resource used to send the discovery information that is allocated by the base station to the user equipment; and a transmitter configured to send the resource information generated by the processor to the user equipment.

* * * * *

UNITED STATES PATENT AND TRADEMARK OFFICE
CERTIFICATE OF CORRECTION

PATENT NO. : 10,237,861 B2
APPLICATION NO. : 15/293693
DATED : March 19, 2019
INVENTOR(S) : Jie Ma et al.

Page 1 of 1

It is certified that error appears in the above-identified patent and that said Letters Patent is hereby corrected as shown below:

In the Claims

In Claim 1, Column 19, Lines 18 and 19, delete "means of".

In Claim 13, Column 21, Line 57, delete "BSR".

Signed and Sealed this
Nineteenth Day of November, 2019

Andrei Iancu
*Director of the United States Patent and Trademark Office*